(12) United States Patent
Lytton et al.

(10) Patent No.: US 9,410,651 B2
(45) Date of Patent: Aug. 9, 2016

(54) COLLECTION OF OIL FLOATING ON A WATER SURFACE BY CONTACT WITH A COLD SURFACE

(76) Inventors: Daniel P. Lytton, Cleveland, OH (US); Raymond J. Keller, Macedonia, OH (US)

(*) Notice: Subject to any disclaimer, the term of this patent is extended or adjusted under 35 U.S.C. 154(b) by 0 days.

(21) Appl. No.: 13/528,182

(22) Filed: Jun. 20, 2012

(65) Prior Publication Data
US 2013/0340970 A1  Dec. 26, 2013

(51) Int. Cl.
| | | |
|---|---|---|
| B01D 37/00 | (2006.01) | |
| F24H 9/00 | (2006.01) | |
| F16L 53/00 | (2006.01) | |
| E02B 15/10 | (2006.01) | |
| F16L 9/18 | (2006.01) | |
| F16L 9/00 | (2006.01) | |

(52) U.S. Cl.
CPC ............... *F16L 53/00* (2013.01); *E02B 15/10* (2013.01); *F16L 9/006* (2013.01); *F16L 9/18* (2013.01)

(58) Field of Classification Search
None
See application file for complete search history.

(56) References Cited

U.S. PATENT DOCUMENTS

| | | | | |
|---|---|---|---|---|
| 3,612,277 | A * | 10/1971 | Van Stavern et al. | 210/776 |
| 4,356,094 | A * | 10/1982 | Ross | 210/774 |
| 5,636,457 | A * | 6/1997 | Eriksson | 37/195 |
| 5,660,055 | A * | 8/1997 | Eriksson | 62/260 |
| 7,585,410 | B2 * | 9/2009 | de Strulle | 210/143 |
| 7,597,799 | B2 * | 10/2009 | de Strulle | 210/143 |
| 7,597,800 | B2 * | 10/2009 | de Strulle | 210/143 |
| 7,601,257 | B2 * | 10/2009 | de Strulle | 210/143 |
| 7,604,732 | B2 * | 10/2009 | de Strulle | 210/143 |
| 7,658,856 | B2 * | 2/2010 | de Strulle | 210/742 |
| 2010/0012597 | A1 * | 1/2010 | David et al. | 210/774 |
| 2013/0340970 | A1 * | 12/2013 | Lytton | F16L 53/00 165/53 |

\* cited by examiner

*Primary Examiner* — Robert James Popovics

(57) ABSTRACT

A crude oil removal device that is attached to a tethered umbilical line which feeds coolant thru the coolant coils. The refrigerated device creates an atmosphere to which crude oil will attach itself to, either floating or submerged for easy removal. The unit consists of two housings that contain the cooling coils which is sealed with rubber to maintain an air tight seal. The unit does not collect water while collecting the crude oil and can be used in virtually any weather condition.

1 Claim, 8 Drawing Sheets

COLLECTION OF OIL FLOATING ON A WATER SURFACE BY CONTACT WITH A COLD SURFACE

BACKGROUND

This invention relates in general to a floating, submergible, floating and/or submergible unit that will be used to collect and remove crude oil from the surface of water as well as below the surface in any weather condition.

When an oil spill occurs, it becomes a bane to the environment as well as wildlife and clean up can be extremely costly. An inordinate amount of time and resources are necessary for reclaim.

This invention will collect and remove crude oil with little to no water and without the need for dispersants in a timely and safe manner.

SUMMARY

The present invention relates to a refrigerated crude oil recovery system that is attached to a primary device and anchoring system with a tethered umbilical line that transfers coolant to and thru coils which cools an exterior and interior housing therefore creating an environment to which crude oil attaches. Submersible either in a raftable or cylindrical unit, the invention is an embodiment of one another; both are comprised of an exterior and interior housing that are sealed together with rubberlike gaskets creating a non-permeable, sealed, air-tight section containing stabilized, cooling coils that transfers coolant thru the housings.

DETAILED DESCRIPTION

Referring now to FIGS. 1-8, the Crude Max Recovery System of the present invention is shown in both embodiments, the Cylindrical and Raftable. In FIG. 1(A) a complete view of the Cylinder shows an exterior-housing comprising of an inner-housing 1 and an outer-housing 2 which are coupled together creating an interior space between the inner housing 1 and the outer housing 2, while incorporating rubber or like product 3 to seal or cap the unit.

Figure 1:
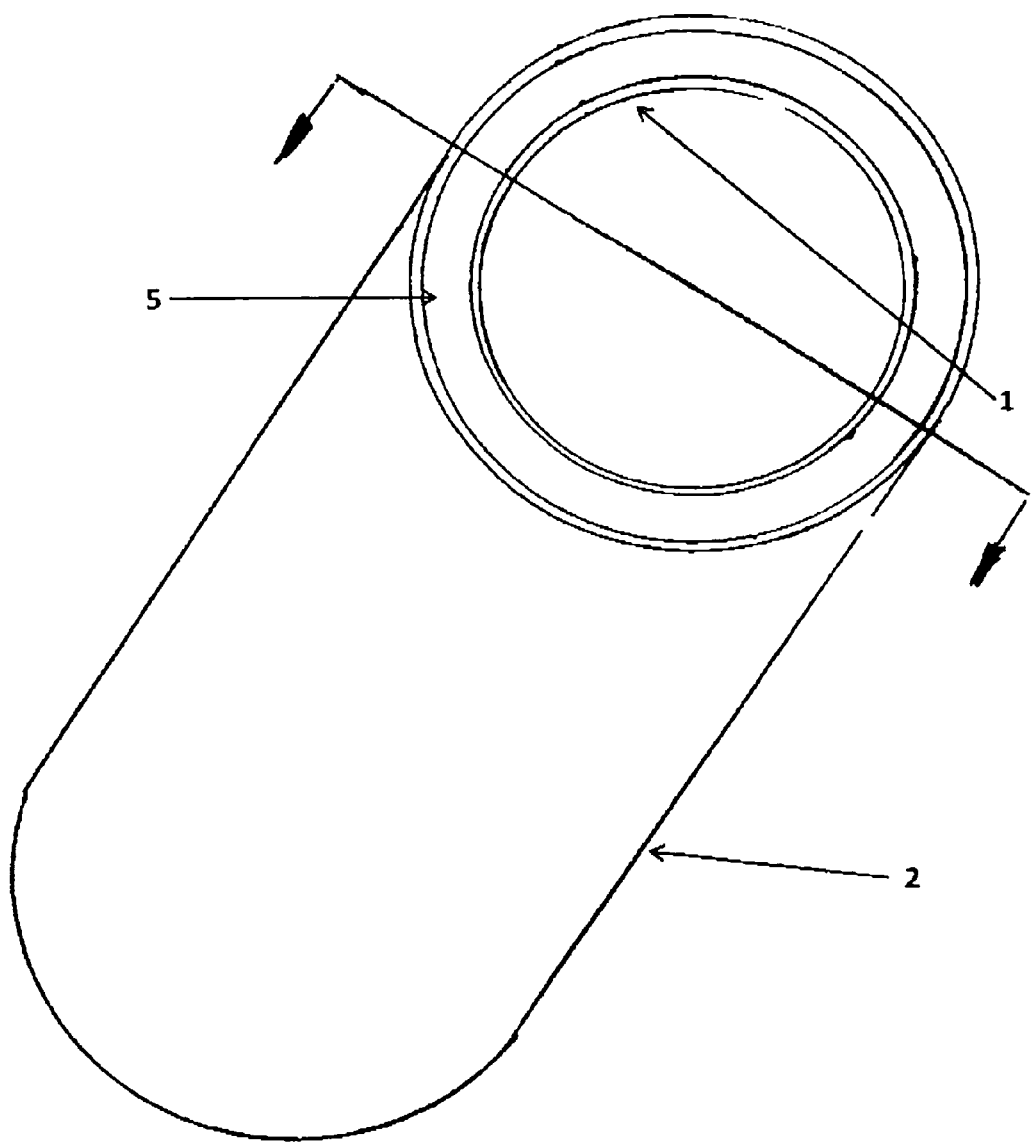
FIG. 1 (A) is a complete View of the present invention. (Cylindrical Unit) Leading to FIG. 2 (AA)
FIG. 2 (AA) is a Sectional View.
Figure 2:
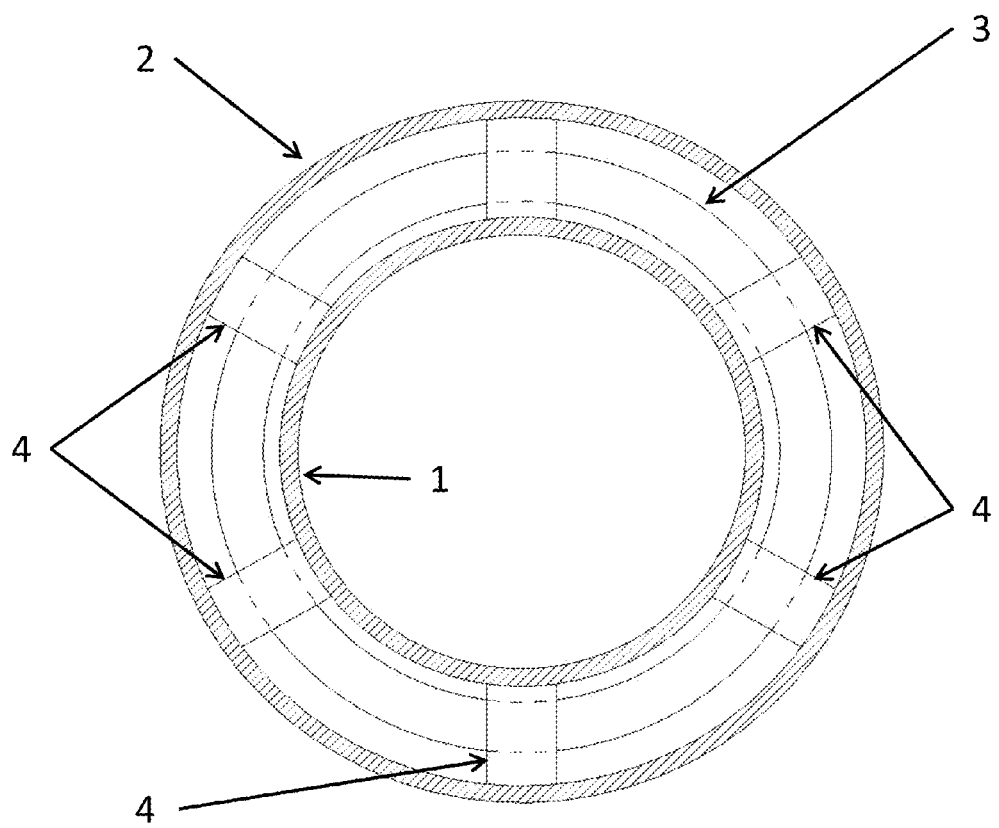
Figure 3:
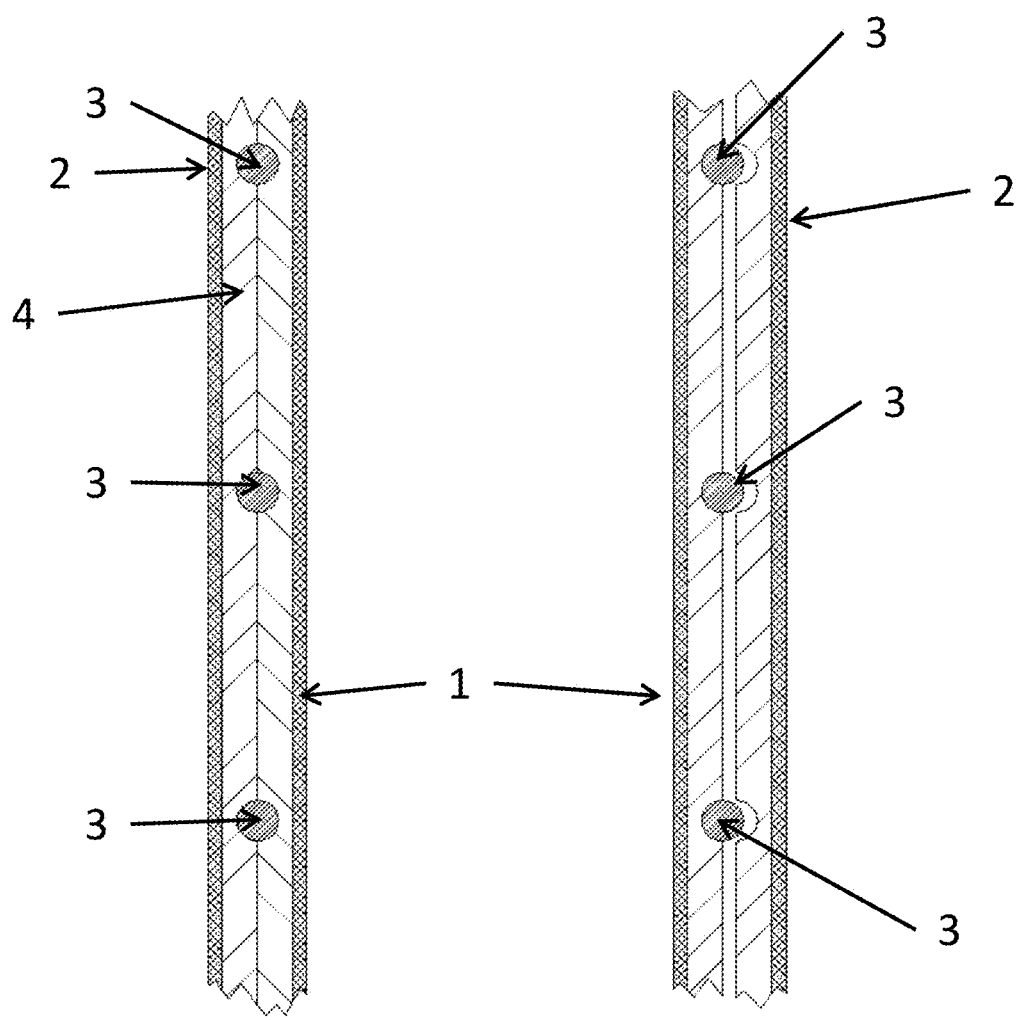
FIG. 3 is a Sectional View

In FIG. 2(AA) shown is a sectional view of the Cylinder. Shown in this embodiment is the inner housing 1 and the outer housing 2 where plastic 4 or other like product is used as a stabilizing brace (referred to hereinafter "Stabilizing Braces") attached to the inner housing 1 and outer housing 2 to secure in place cooling coils 3 to abstain from damage and or movement. The Stabilizing Braces are spaced accordingly to maintain rigidity while also permitting an optimal cooling effect. The cooling coil 3 spirals the circumference and length of the inner housing 1 and the outer housing 2 maintaining an even cooling atmosphere. Similarly, FIG. 3 shows in one position the inner housing 1 and the outer housing 2 joined together enveloping the Stabilizing Braces 4, and the cooling coil 3 when sealed. Noting the second embodiment shows the inner housing 1 and the outer housing 2 and cooling coil 3 prior to connecting and sealing the unit.

Figure 4:
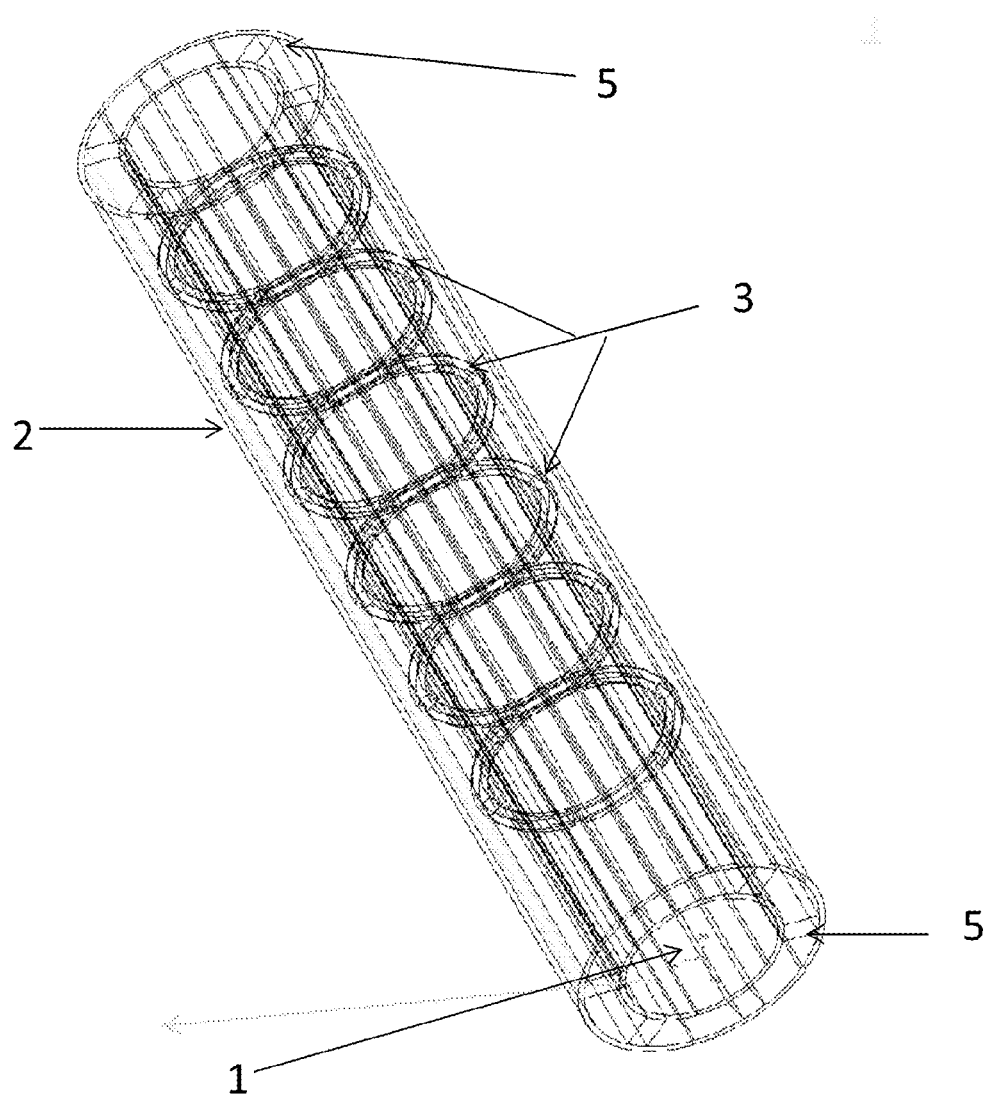
FIG. 4 is a Isometric View
FIG. 5 (A) is a Top view of the present invention. (Raftable Unit) Leading to FIG. 6 (AA)
FIG. 6 (AA) is a Sectional View
Figure 5:
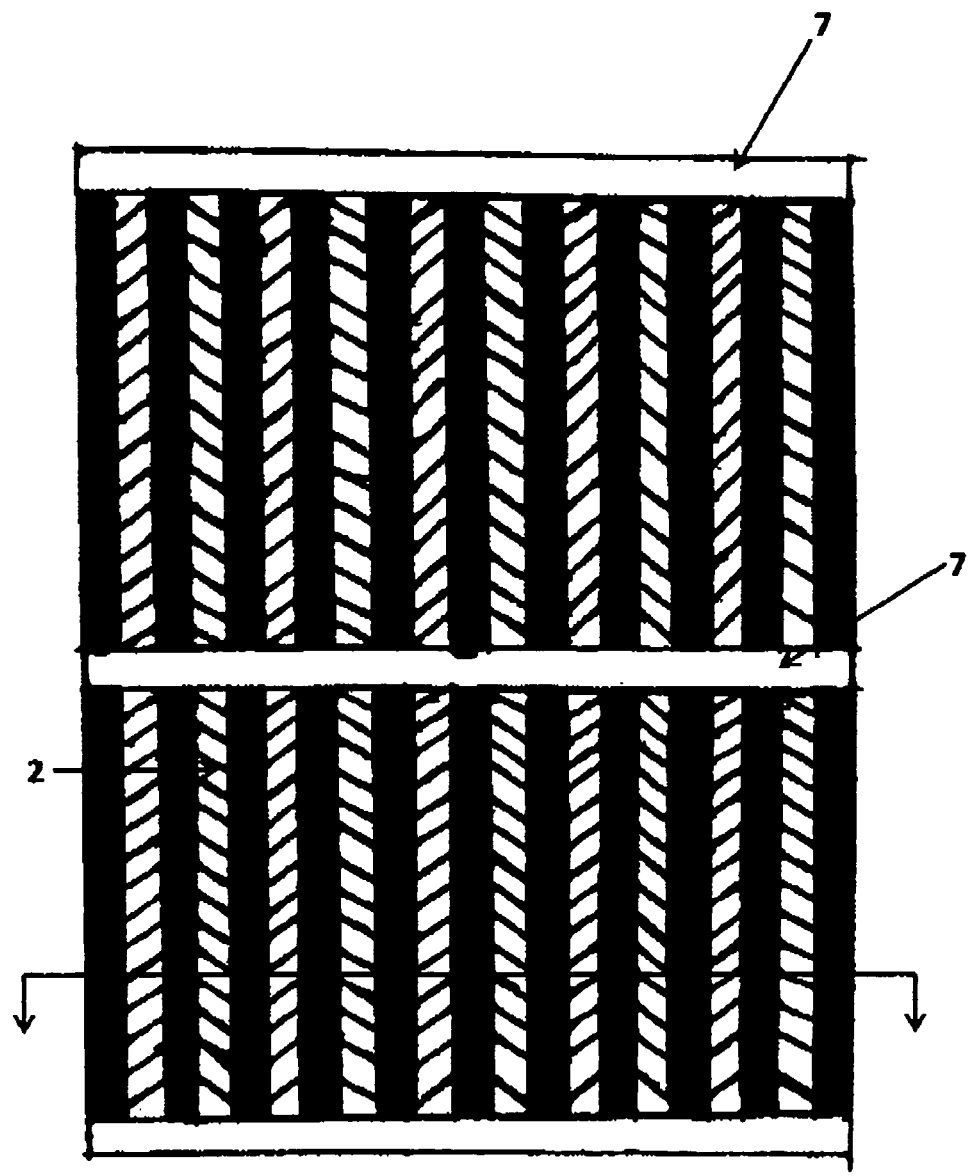

Referring now to the current invention FIG. 4 an isometric transpicuous view of the entire cylindrical unit showing the inner housing 1 and outer housing 2 creating an exterior-housing encapsulating the cooling coils 3 whilst sealing the housing ends with rubber 5 or similar product. Furthermore, again referring to FIG. 4, showing the coolingcoils 3 spaced at even intervals therefore maintaining an even and consistent cooling environment.

Figure 6:
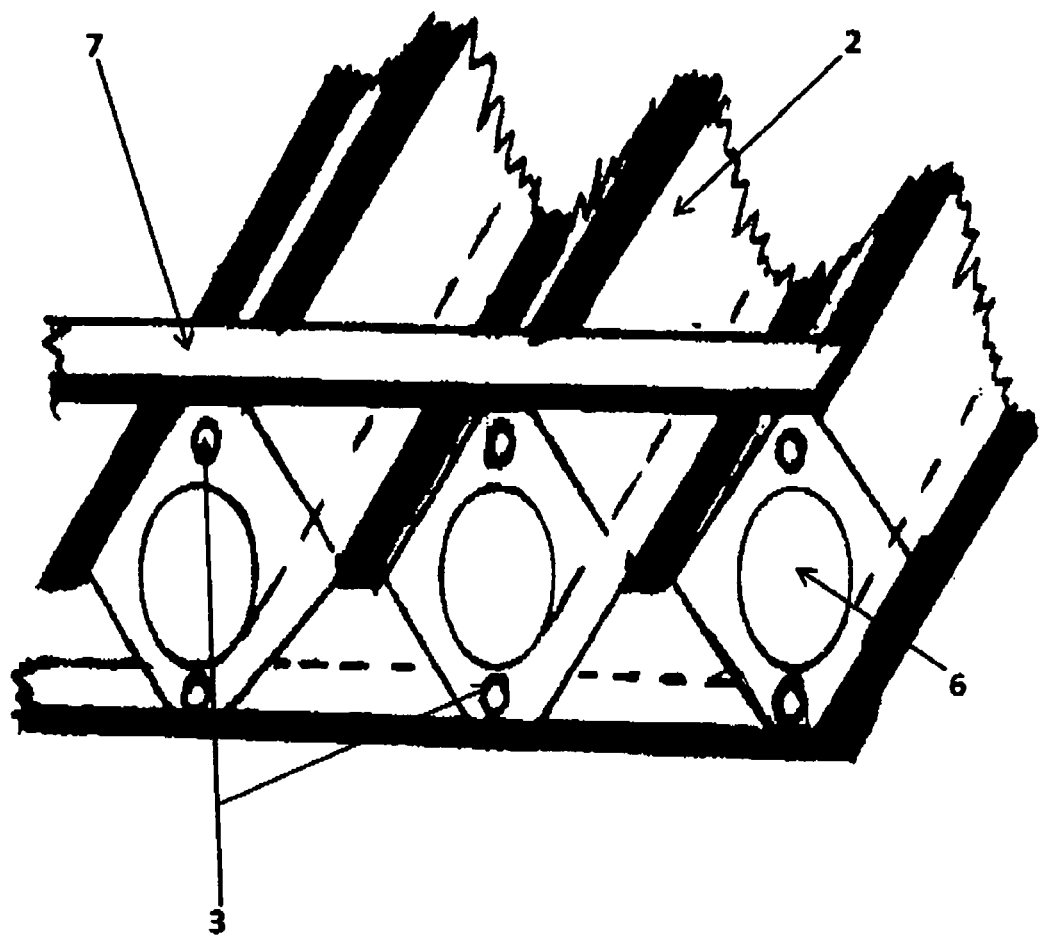

Referring to FIG. 5(A) A top view of the current invention shows the top housing 2 of the raftable embodiment with reinforcement bars 7 to aid in maintaining rigidity. Setting up the view of FIG. 6 (AA). In FIG. 6(AA) shown is a sectional view.

Shown in FIG. 6 (AA) is the exterior-housing 2 encapsulating collection tubes 6 and cooling coils 3. Also shown is a reinforcement bar 7 to maintain rigidity of the outer housing 2.

Figure 7:
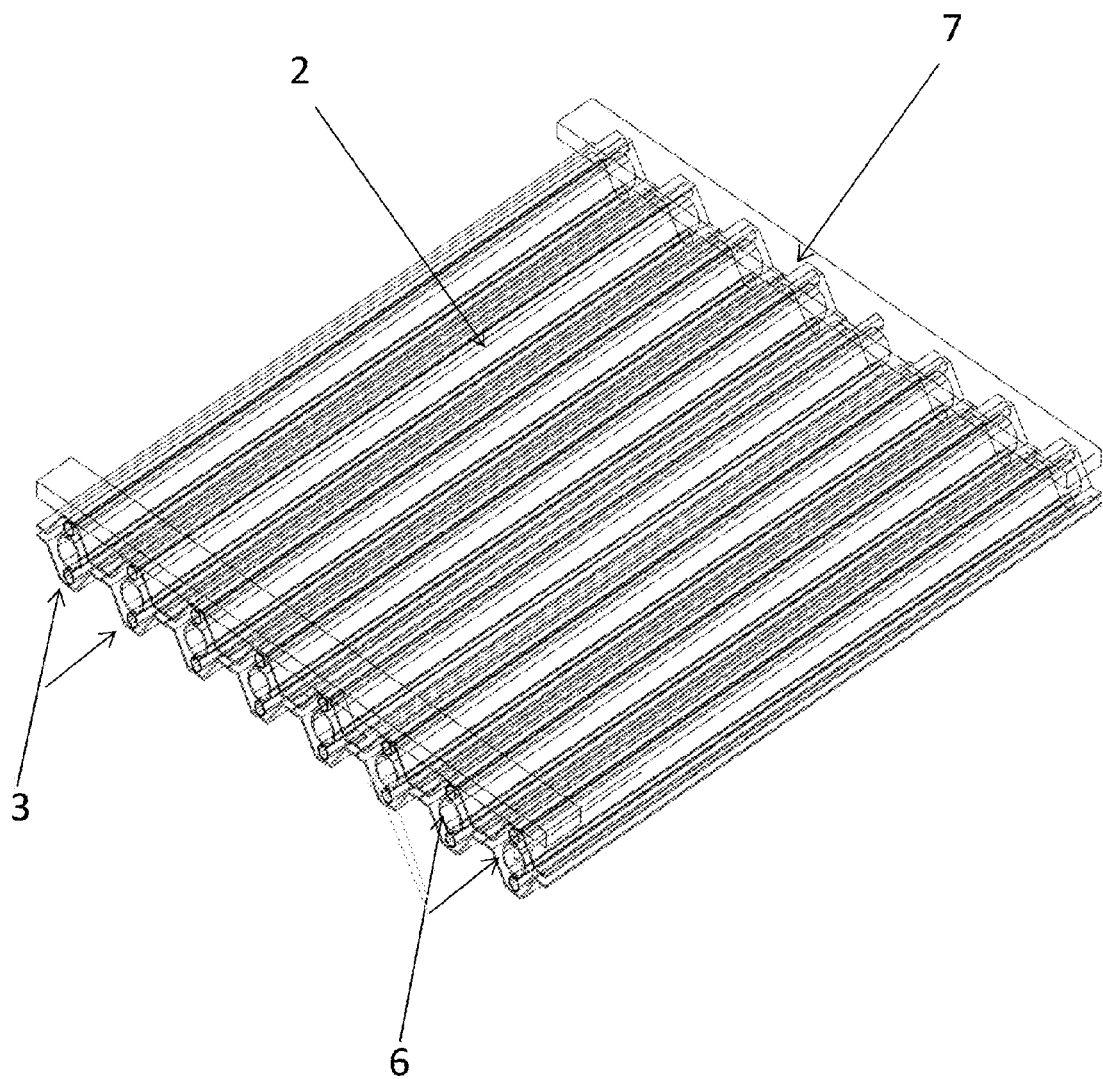
FIG. 7 is a Isometric View

Continuing to FIG. 7 of the current invention is an isometric transpicuous view of the raftable embodiment, the outer housings 2 encapsulating the collection tubes 6 and the cooling coils 3 sealed together as a unit with reinforcement bars 7.

Figure 8:
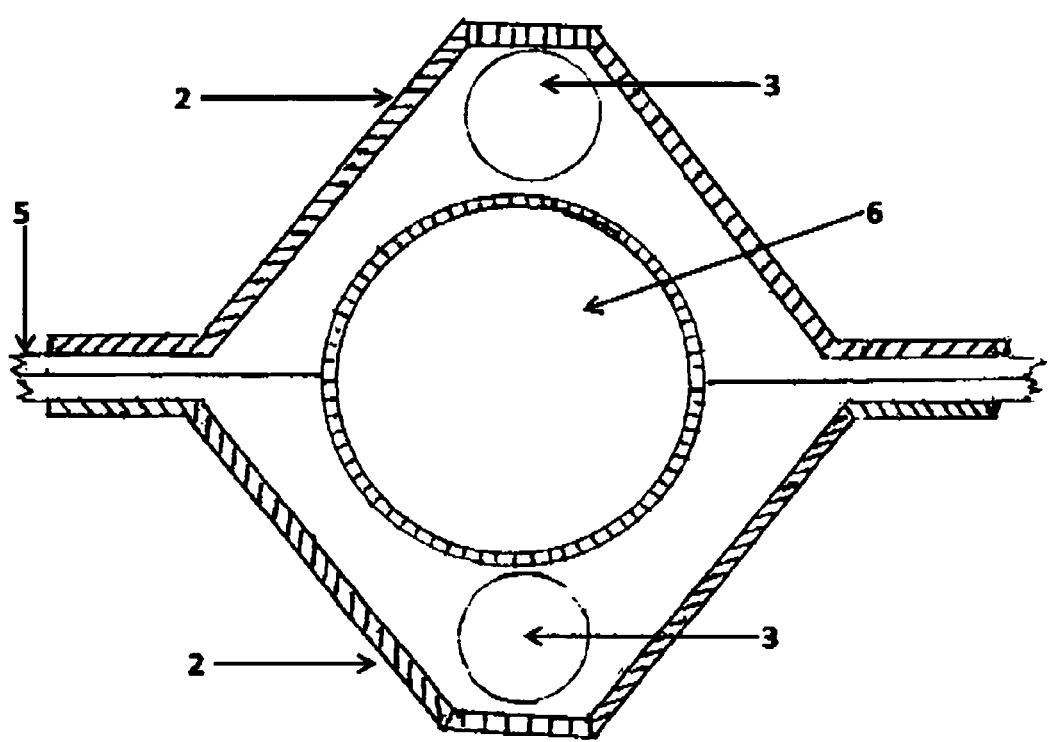
FIG. 8 is a Sectional View

FIG. 8 of the current invention is a sectional view showing two outer housings 2, connected and sealed using rubber 5 or other like product, encapsulating the cooling coils 3 and the collection tube 6. Stabalizing Braces 5 are used to maintain the stability of the cooling coil 3 as well as the collection tube 6 whilst sealing the entire unit.

Although the principles, alternate embodiments, and operation of the present invention have been described in detail herein, the crude max recovery system is not to be construed as being limited to the particular illustrative forms disclosed. It will thus become apparent to those skilled in the art that various modifications of the embodiments herein can be made without departing from the spirit or scope of the invention by the following claims.

The invention claimed is:

1. A method of collecting crude oil from a water body surface or below comprising the steps of:
    providing a refrigerated crude oil recover system including:
        a crude oil recovery device comprising:
            a plurality of collection tubes;
            a pair of metallic outer housings; and
            coolant coils for circulating coolant, said coolant coils being sealingly encapsulated between said collection tubes and said pair of outer housings in a watertight impermeable manner;
        a coolant transfer line tethered to said crude off recovery device for transporting coolant thereto; and
        an optional anchoring system;
        contacting crude oil floating upon or below a water body surface, with said erode oil recovery device; and
        circulating coolant through said coolant coils at a temperature that is considerably colder then the body of water in which said crude oil floats, thereby creating a temperature difference sufficient to cause said crude oil to attach to surfaces of said recovery device in contact with said crude oil.

\* \* \* \* \*